(12) United States Patent
Tsukui

(10) Patent No.: US 9,780,414 B2
(45) Date of Patent: Oct. 3, 2017

(54) METHOD FOR MANUFACTURING SEALED BATTERY

(71) Applicant: TOYOTA JIDOSHA KABUSHIKI KAISHA, Toyoto-shi, Aichi (JP)

(72) Inventor: Akira Tsukui, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 88 days.

(21) Appl. No.: 14/655,215

(22) PCT Filed: Nov. 28, 2013

(86) PCT No.: PCT/JP2013/082028
§ 371 (c)(1),
(2) Date: Jun. 24, 2015

(87) PCT Pub. No.: WO2014/103603
PCT Pub. Date: Jul. 3, 2014

(65) Prior Publication Data
US 2015/0349386 A1 Dec. 3, 2015

(30) Foreign Application Priority Data
Dec. 26, 2012 (JP) ................................ 2012-283406

(51) Int. Cl.
| | |
|---|---|
| *H01M 10/42* | (2006.01) |
| *G01M 3/20* | (2006.01) |
| *H01M 2/08* | (2006.01) |
| *H01M 10/04* | (2006.01) |
| *G01M 3/22* | (2006.01) |

(52) U.S. Cl.
CPC ......... *H01M 10/4228* (2013.01); *G01M 3/20* (2013.01); *G01M 3/229* (2013.01); *H01M 2/08* (2013.01); *H01M 10/04* (2013.01); *H01M 10/0431* (2013.01); *Y10T 29/49112* (2015.01)

(58) Field of Classification Search
CPC .......................... H01M 10/4228; H01M 10/04
See application file for complete search history.

(56) References Cited

U.S. PATENT DOCUMENTS

2015/0155603 A1 6/2015 Tsukui

FOREIGN PATENT DOCUMENTS

| CN | 104604008 A | 5/2015 |
|---|---|---|
| JP | 05-021089 A | 1/1993 |

(Continued)

OTHER PUBLICATIONS

International Search Report of PCT/JP2013/082028 dated Mar. 4, 2014 [PCT/ISA/210].

*Primary Examiner* — Nicholas P D'Aniello
*Assistant Examiner* — Abibatu Ojo-Amoo
(74) *Attorney, Agent, or Firm* — Sughrue Mion, PLLC

(57) ABSTRACT

Provided is a method for manufacturing a sealed battery, capable of reducing an erroneous determination rate in a leak testing step. The method including the leak testing step for detecting leak of a detection gas introduced into a battery case, includes: an introducing step for introducing the detection gas into the battery case which is temporarily sealed by covering the battery case; and an adjusting step for adjusting at least one of the pressure inside the battery case temporarily sealed and the pressure outside the battery case so that the pressure inside the battery case into which the detection gas has been introduced is lower than the pressure outside the battery case.

1 Claim, 16 Drawing Sheets

(56) References Cited

FOREIGN PATENT DOCUMENTS

| | | |
|---|---|---|
| JP | 2002-117901 A | 4/2002 |
| JP | 2014-035830 A | 2/2014 |
| JP | 2014-524519 | 9/2014 |
| WO | 2014/010024 A1 | 1/2014 |

FIG. 3
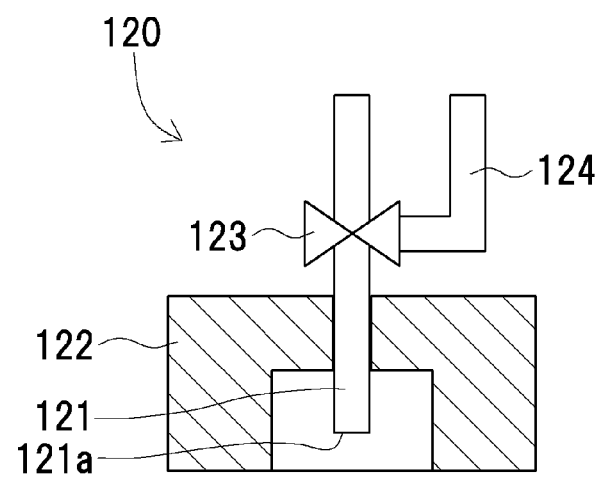
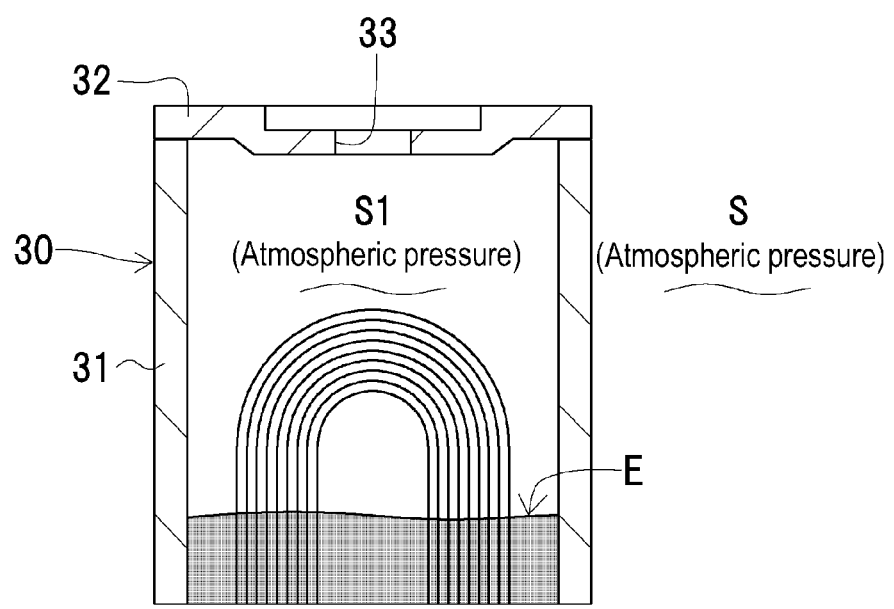

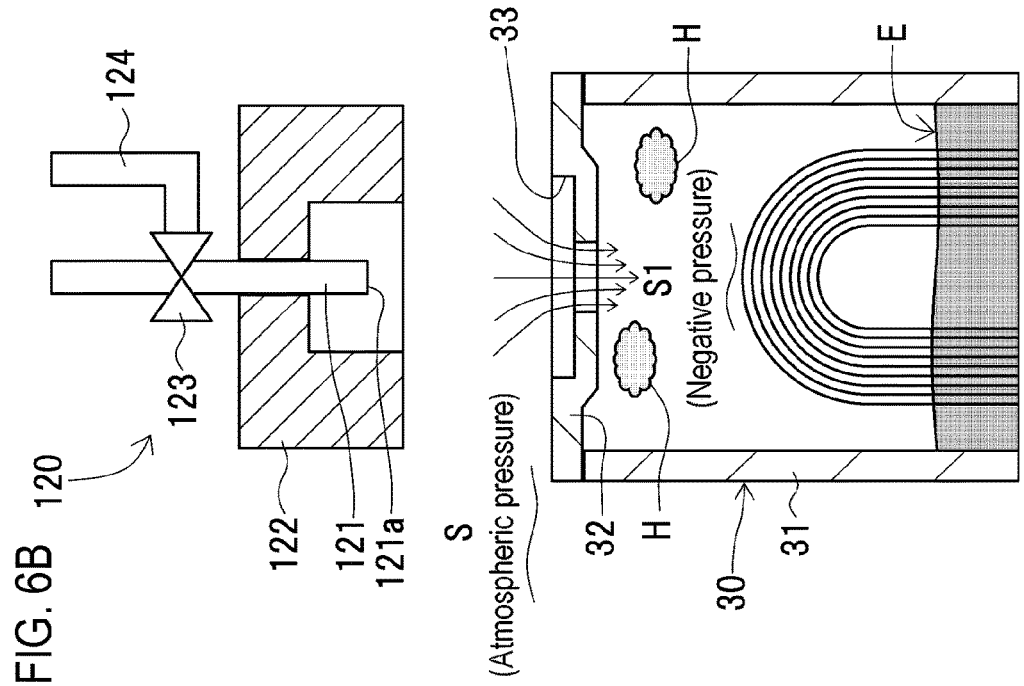
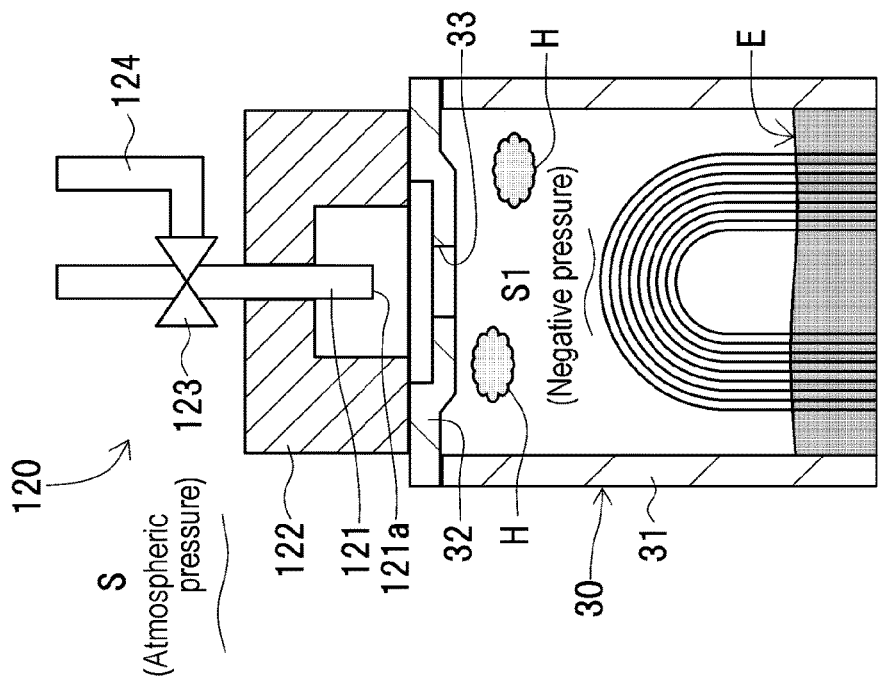

METHOD FOR MANUFACTURING SEALED BATTERY

CROSS REFERENCE TO RELATED APPLICATIONS

This application is a National Stage of International Application No. PCT/JP2013/082028, filed Nov. 28, 2013, claiming priority based on Japanese Patent Application No. 2012-283406, filed Dec. 26, 2012, the contents of all of which are incorporated herein by reference in their entirety.

TECHNICAL FIELD

The present invention relates to a method for manufacturing a sealed battery, including a leak testing step for detecting leak of a detection gas introduced into a battery case.

BACKGROUND ART

Conventionally, a step for manufacturing a sealed battery includes a leak testing step for checking the airtightness of a battery case for the purpose of, for example, prevention of degradation of battery performance caused by ingress of moisture into the battery case (see JP-A 2002-117901, for example).

JP-A 2002-117901 discloses a technique as follows:

First, a pouring nozzle is brought into contact with a lid of a battery can (a battery case), and is attached to a pouring hole.

Next, an electrolyte solution is poured into the battery can through the pouring nozzle, and a helium gas is introduced into the battery can.

Then, the pouring nozzle is detached from the pouring hole to seal the pouring hole with a laser welding means.

Finally, the sealed battery can is placed in a chamber for leak detection to perform a leak testing step. In the leak testing step, a determination is made with a helium-leak tester as to whether the helium gas leaks from the battery can.

The helium gas has molecular weight smaller than that of a gas inside the battery can. Therefore, as shown in FIG. 15, most of the helium gas introduced through the pouring hole stays in the vicinity of the pouring hole, and leaks to the outside of the battery can through the pouring hole before the leak testing step.

In other words, in the technique disclosed in JP-A 2002-117901, since a large amount of the helium gas leaks out before the leak testing step, a density of the helium gas inside the battery can is not maintained during the leak testing step, and consequently the density of the helium gas inside the battery can decreases in the leak testing step.

In the leak testing step, for example, a determination of the leak test is made by measuring an amount of the helium gas leaking from the battery can per unit time based on an output value of the helium-leak tester. As shown in a graph G11 in FIG. 16, if the density of the helium gas inside the battery can is low in the leak testing step, the amount of the helium gas leaking from the battery can per unit time decreases. Therefore, the output value of the helium-leak tester is wholly low.

As shown in FIG. 16, a threshold T1 of the leak testing step is set in consideration of the case where the density of the helium gas inside the battery can is low in the leak testing step. In other words, for example, the following value is set to the threshold T1: the output value of the helium-leak tester for the case of testing the battery can in which the density of the helium gas is low in the leak testing step and the leakage amount of the helium gas per unit time is a predetermined amount L.

As in the technique disclosed in JP-A 2002-117901, if the leakage amount of the helium gas before the leak testing step is large, the density of the helium gas inside the battery can varies widely during the leak testing step.

Therefore, in the case of testing the battery can in which a leakage amount L0 of the helium gas per unit time is slightly smaller than the predetermined amount L, if the density of the helium gas inside the battery can is larger, by the effect of the variation in the density of the helium gas, than that inside the battery can in which the leakage amount of the helium gas is the predetermined amount L, the output value of the helium-leak tester may exceed the threshold T1 with a relatively high probability (see the dot and a graph G12 in FIG. 16).

As mentioned above, in the technique disclosed in JP-A 2002-117901, a normal product may be erroneously determined to be a defective product with a relatively high probability (see an area R11 in FIG. 16 where an erroneous determination is made).

In other words, the technique disclosed in JP-A 2002-117901 may cause an increase in an erroneous determination rate.

CITATION LIST

Patent Literature

PTL 1: JP-A 2002-117901

SUMMARY OF INVENTION

Technical Problem

The present invention has been accomplished in view of the situation as mentioned above. The object of the present invention is to provide a method for manufacturing a sealed battery, capable of reducing an erroneous determination rate in a leak testing step.

Solution to Problem

A first aspect of the invention is a method for manufacturing a sealed battery, including a leak testing step for detecting leak of a detection gas introduced into a battery case, the method including: an introducing step for introducing the detection gas into the battery case which is temporarily sealed by covering the battery case; and an adjusting step for adjusting at least one of a pressure inside the battery case temporarily sealed and a pressure outside the battery case so that the pressure inside the battery case into which the detection gas has been introduced is lower than the pressure outside the battery case. The leak testing step is performed after the adjusting step.

Preferably, the introducing step and the adjusting step are performed at the same time by reducing the pressure inside the battery case temporarily sealed to a first pressure lower than the pressure outside the battery case, and then introducing the detection gas into the decompressed battery case to increase the pressure inside the battery case to a second pressure lower than the pressure outside the battery case.

Advantageous Effects of Invention

The present invention makes it possible to reduce an erroneous determination rate in a leak testing step.

BRIEF DESCRIPTION OF DRAWINGS

FIG. 3 shows an introducing device.

FIG. 5 shows how to introduce a helium gas in the first manufacturing step for manufacturing the sealed battery, in which

FIG. 6 shows how to detach the introducing device from a pouring hole in the first manufacturing step for manufacturing the sealed battery, in which FIG. 6A shows a situation before detaching the introducing device, and FIG. 6B shows a situation after detaching the introducing device.

FIG. 7 shows how to seal the pouring hole, in which

DESCRIPTION OF EMBODIMENTS

Described below is a first manufacturing step for manufacturing a battery 10 as a first embodiment of a method for manufacturing a sealed battery according to the present invention.

Figure 1:
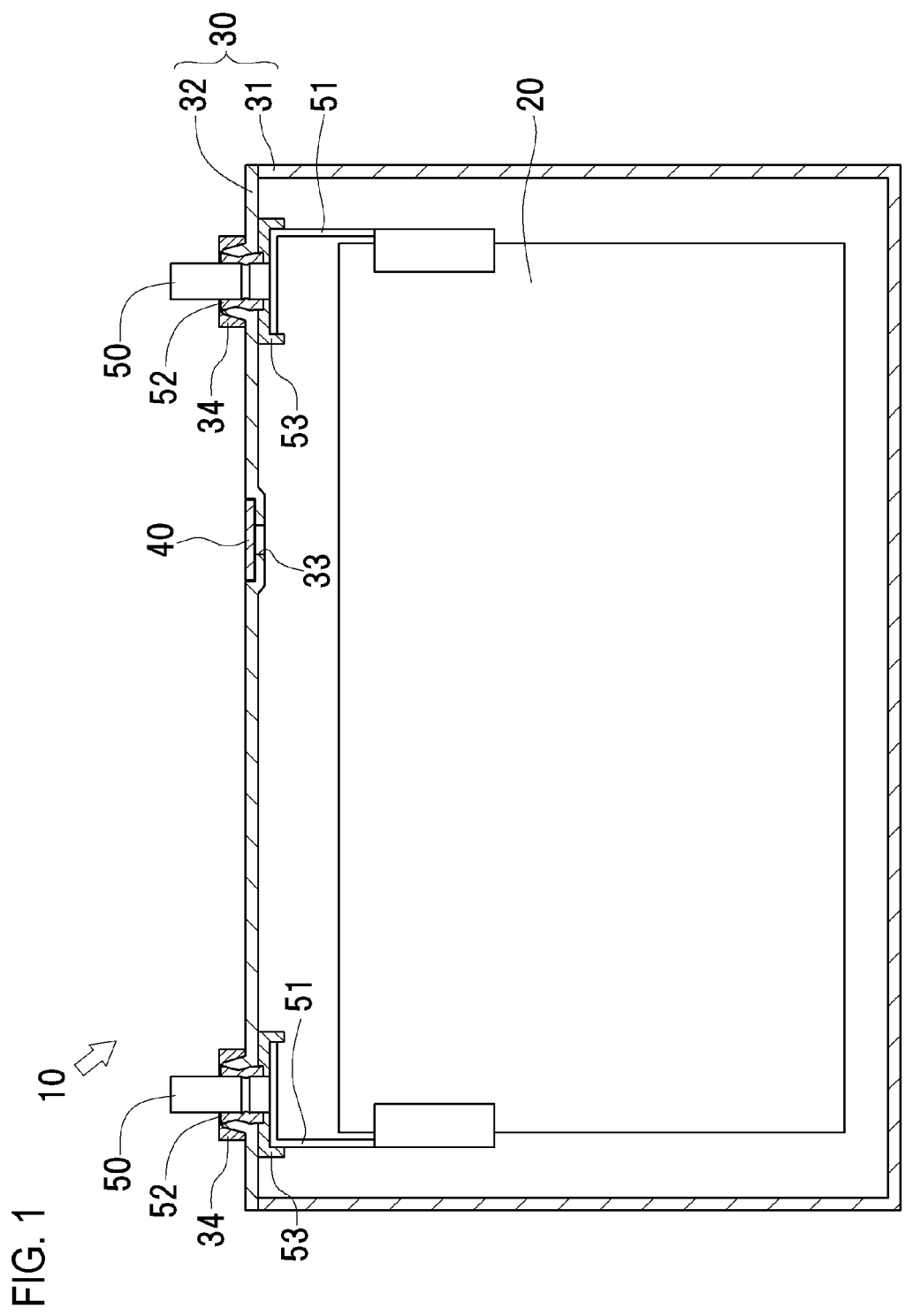
FIG. 1 shows the whole structure of a sealed battery.

With reference to FIG. 1, the battery 10 as an embodiment of a sealed battery according to the present invention is described.

The battery 10 is a sealed lithium-ion secondary battery. The present invention is applicable not only to the lithium-ion secondary battery but also to another sealed battery such as a nickel-hydrogen secondary battery.

The first manufacturing step for manufacturing the battery 10 includes a leak testing step for detecting leak of a detection gas introduced into a battery case in order to check the sealability of the battery case.

The battery 10 includes a power generating element 20, an exterior 30, a cap 40, and two outside terminals 50.

The power generating element 20 is made by impregnating an electrolyte solution into an electrode body formed by laminating and winding a positive electrode, a negative electrode and a separator. A chemical reaction occurs inside the power generating element 20 during electric charging and discharging of the battery 10 (specifically, ions move between the positive electrode and the negative electrode through the electrolyte solution), thereby an electric current is generated.

The exterior 30 serving as the battery case is a can in the shape of substantially a rectangular parallelepiped, and has a storage part 31 and a lid part 32.

The storage part 31 is a member formed in a bottomed square tube having one open face, and contains the power generating element 20 therein.

The lid part 32 is formed in a flat plate with a shape in conformity with the open surface of the storage part 31, and is joined to the storage part 31 in such a manner as to close the open surface of the storage part 31. In the lid part 32, as mentioned later, a pouring hole 33 through which the electrolyte solution is poured is formed between the parts into which the outside terminals 50 are inserted.

The pouring hole 33 is formed in substantially a circle as viewed in a plan view, and the parts of the pouring hole 33 situated on the outside and the inside of the lid part 32 has different inner diameters. In the pouring hole 33, the upper part (upper-side part in FIG. 1) thereof has an inner diameter larger than that of the lower part (lower-side part in FIG. 1)

In the present embodiment, the battery is the prismatic battery having the exterior formed in the bottomed square tube. However, the battery is not limited thereto. For example, the battery may be a cylindrical battery having an exterior formed in a bottomed cylinder.

The cap 40 is used to seal the pouring hole 33. The cap 40 has substantially the same shape as the upper part of the pouring hole 33. The cap 40 is fitted to the upper part of the pouring hole 33 in such a manner as to close the lower part of the pouring hole 33. The outer peripheral edge of the cap 40 is welded with a laser beam, and thereby the cap 40 is joined to the lid part 32.

The outside terminals 50 are arranged so that parts thereof protrude from the outside surface of the lid part 32 upward (outward) of the battery 10. The outside terminals 50 are electrically connected to the positive electrode and the negative electrode of the power generating element 20 through two current collecting terminals 51, respectively. The outside terminals 50 are fixed to the lid part 32 through insulating members 52 and 53 in an insulating manner by fitting two fixing members 34 into the outer circumferential surfaces of the outside terminals 50. The outside terminals 50 and the current collecting terminals 51 function as energization paths for taking out electric power stored in the power generating element 20 or taking in electric power from the outside to the power generating element 20.

The current collecting terminals 51 are connected to the positive electrode and the negative electrode of the power generating element 20, respectively. The materials of the current collecting terminals 51 may be, for example, aluminum on a positive electrode side and copper on a negative electrode side.

The outside terminals 50 have bolt parts formed by applying roll threading to the parts thereof protruding outward of the battery 10. During actual use of the battery 10, a bus bar and a member such as a connecting terminal for an outside device are securely fastened to the outside terminals 50 by use of the bolt parts.

When securely fastening these members, fastening torque is applied to the outside terminals 50, and screw tightening applies external force in the axial direction. Accordingly, it is preferable that a highly strong material such as iron is used as the materials of the outside terminals 50.

The first manufacturing step is described below.

In the first manufacturing step, the surfaces of current collectors (a positive electrode current collector and a negative electrode current collector) are coated with mixtures (a positive electrode mixture and a negative electrode mixture) by a coating machine such as a die coater, and then the mixtures are dried.

Thereafter, the mixtures applied onto the surfaces of the current collectors are pressed, thereby forming mixture layers (a positive electrode mixture layer and a negative electrode mixture layer) on the surfaces of the current collectors.

In this manner, the positive electrode and the negative electrode are fabricated.

In the first manufacturing step, the positive electrode and the negative electrode fabricated through the above-mentioned process, and the separator are laminated and wound, thus forming the electrode body. After that, the outside terminals 50 and the current collecting terminals 51 integrated with the lid part 32 of the exterior 30 are connected to the electrode body, and the electrode body is then stored in the storage part 31 of the exterior 30. Thereafter, the storage part 31 and the lid part 32 of the exterior 30 are joined by welding to seal the exterior 30.

Figure 2:
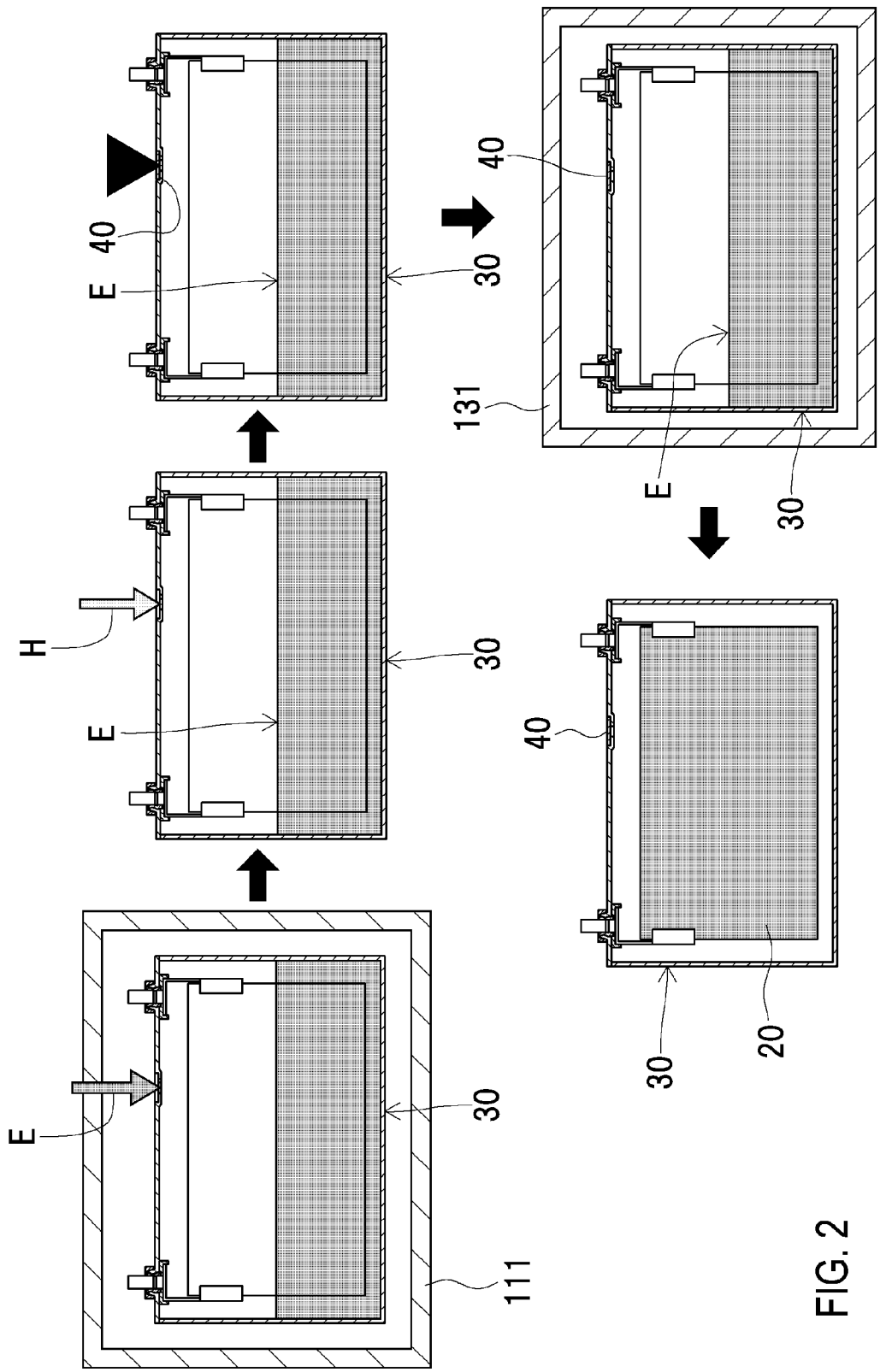
FIG. 2 shows a step for manufacturing the sealed battery.

As shown in FIG. 2, after the exterior 30 is sealed, an electrolyte solution E is poured through the pouring hole 33 (see an arrow E in FIG. 2).

At this time, for example, the exterior 30 is stored in a chamber 111, and a predetermined pouring unit is set on the exterior 30, then producing a vacuum inside the chamber 111. Thereafter, the air is introduced into the chamber 111 to return the pressure inside the chamber 111 to the atmospheric pressure. In the first manufacturing step, the electrolyte solution E is poured into the exterior 30 by utilizing the differential pressure produced at this time.

After the electrolyte solution E is poured into the exterior 30, the exterior 30 is moved to the outside of the chamber 111, and a helium gas H is then introduced into the exterior 30 (see an arrow H in FIG. 2).

At this time, the helium gas H is introduced by using an introducing device 120 shown in FIG. 3, for example.

As shown in FIG. 3, the introducing device 120 has a sealing nozzle 121, a sealing member 122, and a valve 123.

The sealing nozzle 121 is arranged above the pouring hole 33, and has a jetting port 121a at the lower end thereof. The valve 123 is connected to the middle part of the sealing nozzle 121 in the vertical direction.

The sealing nozzle 121 is connected to a predetermined decompressing pump via the valve 123, a pipe 124 and the like. In other words, in the introducing device 120, a decompressing path P1 is formed as a path extending from the sealing nozzle 121 to the decompressing pump (see FIG. 5A).

The sealing nozzle 121 is connected to a predetermined helium gas supplying source via the valve 123 and the like. In other words, in the introducing device 120, a supplying path P2 is formed as a path extending from the helium gas supplying source to the sealing nozzle 121 (see FIG. 5B).

The sealing member 122 has the shape of substantially a bottomed tube through which a through hole penetrates in the vertical direction, the through hole formed at the bottom (upper surface) of the bottomed tube.

The sealing nozzle 121 is inserted into the through hole of the sealing member 122. The jetting port 121a of the sealing nozzle 121 is arranged inside the sealing member 122.

The valve 123 closes one of the decompressing path P1 and the supplying path P2, and opens the other. In other words, the introducing device 120 switches the path communicating with the sealing nozzle 121 to any one of the decompressing path P1 and the supplying path P2 under the control of the valve 123.

The introducing device 120 configured as mentioned above is, for example, arranged in such an equipment that the pressure of an external space S of the exterior 30 is the atmospheric pressure.

Therefore, at the time before introducing the helium gas H, the pressures of an internal space S1 and the external space S of the exterior 30 are the atmospheric pressure each.

Figure 4:
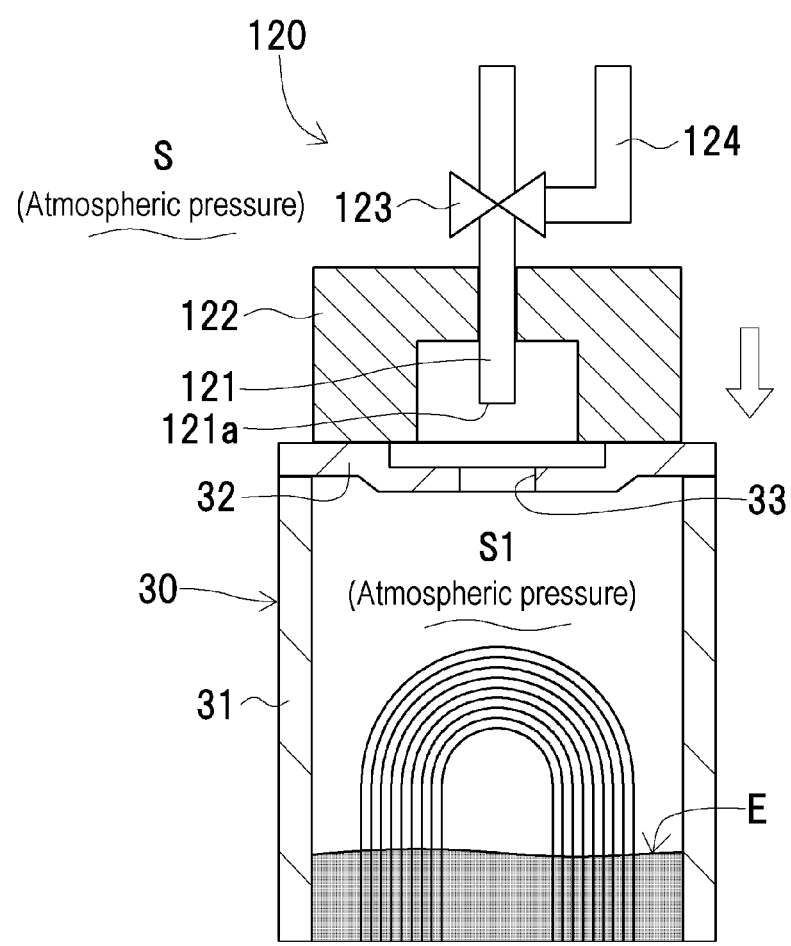
FIG. 4 shows how to temporally seal an exterior in a first manufacturing step for manufacturing the sealed battery.

As shown in FIG. 4, when the helium gas H is introduced into the exterior 30, the introducing device 120 is moved into proximity with the exterior 30 to press the sealing member 122 against the lid part 32 (see the arrow in FIG. 4). In this manner, the introducing device 120 seals the pouring hole 33. The sealing member 122 comes in contact with the outer circumferential surface of the vertical middle part of the sealing nozzle 121.

Thus, the exterior 30 (the pouring hole 33) is covered, thereby the internal space S1 of the exterior 30 is separated from the external space S to temporarily seal the exterior 30. In other words, a closed space is produced inside the exterior 30.

Figure 5A:
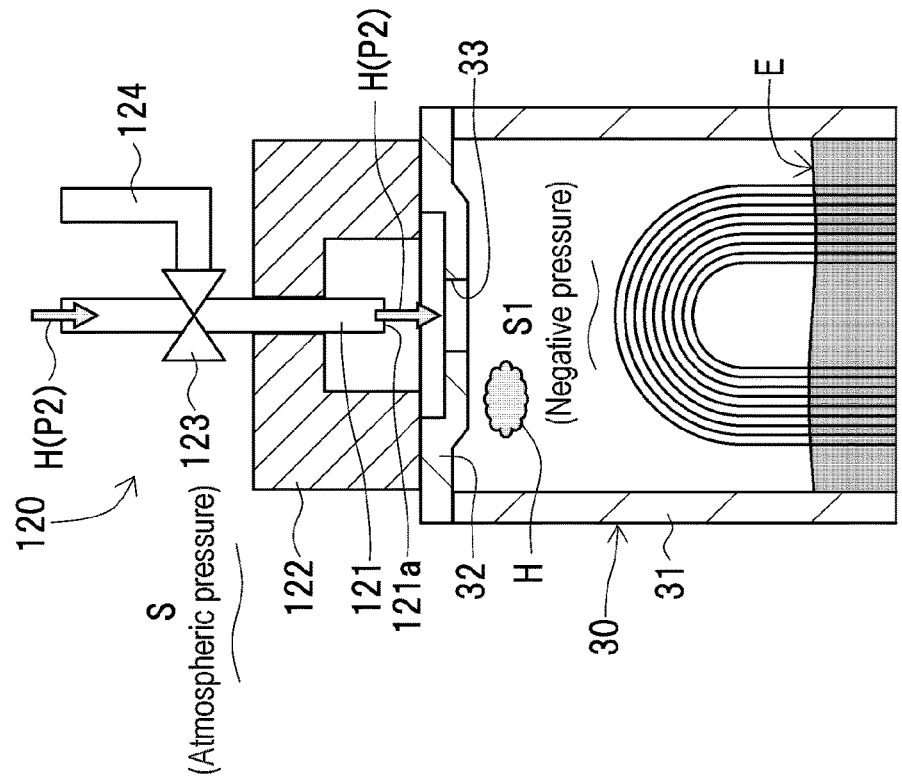
FIG. 5A shows a situation where the exterior is being decompressed.

As shown in FIG. 5A, after the exterior 30 is temporarily sealed, the decompressing path P1 is opened (communication between the decompressing path P1 and the sealing nozzle 121 is allowed), and an air A inside the exterior 30 is discharged to the outside. In other words, the pressure inside the exterior 30 is reduced (see the internal space S1 in FIG. 5A).

The introducing device 120 is provided with a pressure gauge capable of measuring the pressure inside the above-mentioned exterior 30. The introducing device 120 reduces the pressure inside the exterior 30 to a first pressure while measuring the pressure inside the exterior 30 with the pressure gauge.

Then, the pressure inside the exterior 30 having been reduced to the first pressure is increased with the helium gas H.

Figure 5B:
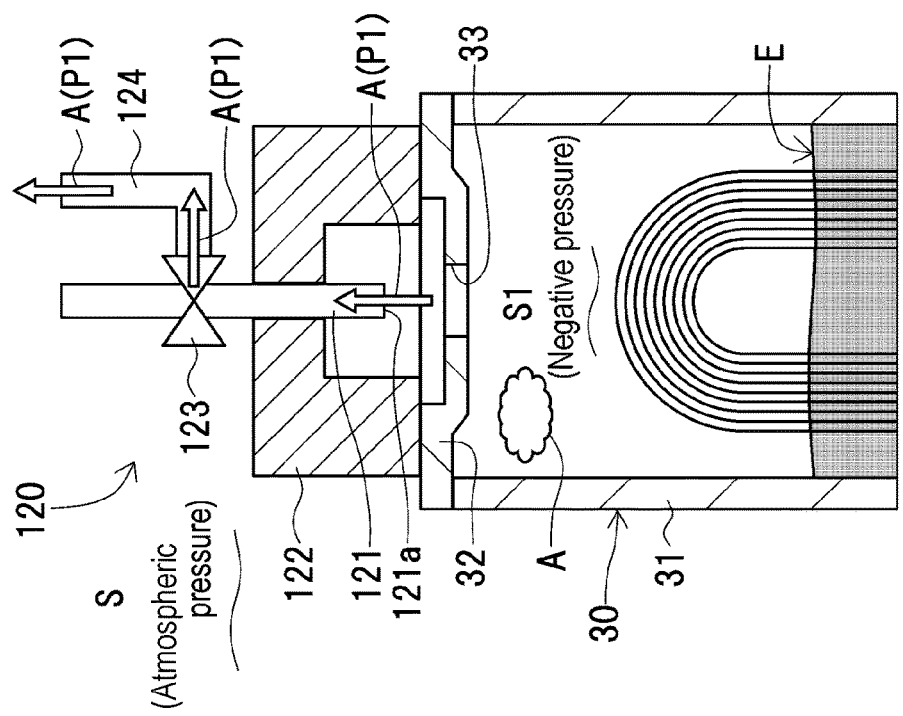
FIG. 5B shows a situation where the helium gas is being introduced.

Specifically, as shown in FIG. 5B, the supplying path P2 is opened (communication between the supplying path P2 and the sealing nozzle 121 is allowed), and the helium gas H is supplied to the sealing nozzle 121 from the helium gas supplying source to make the helium gas H jet from the jetting port 121a of the sealing nozzle 121.

As mentioned above, the first manufacturing step includes an introducing step for introducing the helium gas H into the exterior 30 temporarily sealed.

As shown in FIG. 2, after the helium gas H is introduced into the exterior 30, the introducing device 120 is detached from the pouring hole 33 to remove the temporary seal of the exterior 30, and then the pouring hole 33 is sealed with the cap 40.

At this time, the cap 40 is fit into the upper part of the pouring hole 33 in such a manner as to seal the lower part of the pouring hole 33. Thereafter, the outer edge of the cap 40 is irradiated with a laser beam from a laser welding machine to seal the pouring hole 33 (see the black-painted triangle in FIG. 2).

A device for sealing the pouring hole 33 in this manner is, similarly to the introducing device 120, arranged in such an equipment that the pressure of the external space S of the exterior 30 is the atmospheric pressure.

After the pouring hole 33 is sealed, the leak of the helium gas H from the exterior 30 (i.e., the sealability of the exterior 30) is tested.

At this time, the exterior 30 is housed in a chamber 131, and a vacuum is produced inside the chamber 131. Thereafter, the amount of the helium gas H leaking from the exterior 30 per unit time is measured with a commercially available helium-leak tester.

A determination is made, based on an output value of the helium-leak tester, as to whether the exterior 30 has the leak.

In this manner, the leak testing step for detecting the leak of the helium gas H is performed in the first manufacturing step. In other words, in the first manufacturing step, the helium gas H is used as the detection gas.

After the first manufacturing step is performed, an initial charge, an inspection of voltage and the like are performed with respect to the battery 10.

As mentioned above, the sealed battery 10 is manufactured in the first manufacturing step.

The helium gas H has a molecular weight smaller than that of a gas present in the exterior 30. Therefore, as shown in FIG. 6A, the helium gas H introduced into the exterior 30 stays in the vicinity of the pouring hole 33.

In the case where the pressure of the external space S of the exterior 30 is the atmospheric pressure as in the present embodiment, when introducing the helium gas H into the exterior 30 to return the pressure inside the exterior 30 to the atmospheric pressure, most of the helium gas H may leak through the pouring hole 33.

Accordingly, as shown in FIGS. 5 and 6A, in the first manufacturing step, the helium gas H is made to jet while checking a pressure variation inside the exterior 30, the pressure inside the exterior 30 having been reduced to the first pressure is increased to a second pressure lower than the atmospheric pressure.

Specifically, the introducing device 120 introduces the helium gas H into the exterior 30 in the amount smaller than that of the air A discharged from the exterior 30. In other words, the helium gas H is introduced into the exterior 30 in the amount according to a pressure variation (difference between the first pressure and the second pressure) inside the exterior 30 (see arrows A and H in FIG. 5).

In this manner, a negative pressure is produced in the exterior 30 into which the helium gas H has been introduced, and a difference in pressure is produced between the inside and the outside of the exterior 30 (see the internal space S1 and the external space S in FIG. 6A).

As shown in FIG. 6B, when the introducing device 120 is detached from the pouring hole 33, the open air flows from the external space S into the internal space S1 by the difference in pressure between the inside and the outside of the exterior 30. In other words, when the introducing device 120 is detached from the pouring hole 33, an aerial current can be generated from the pouring hole 33 toward the inside of the exterior 30 (see the arrows in FIG. 6B).

Figure 7A:
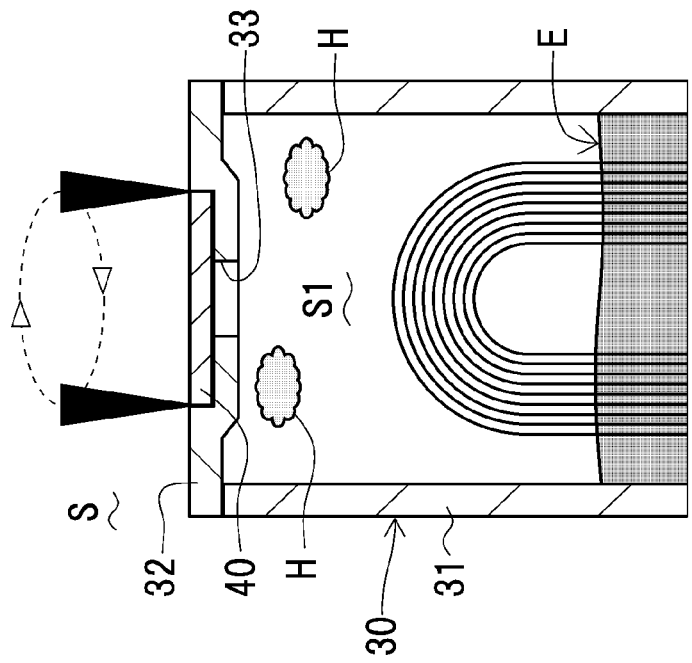
FIG. 7A shows how to place a cap over the pouring hole.
Figure 7B:
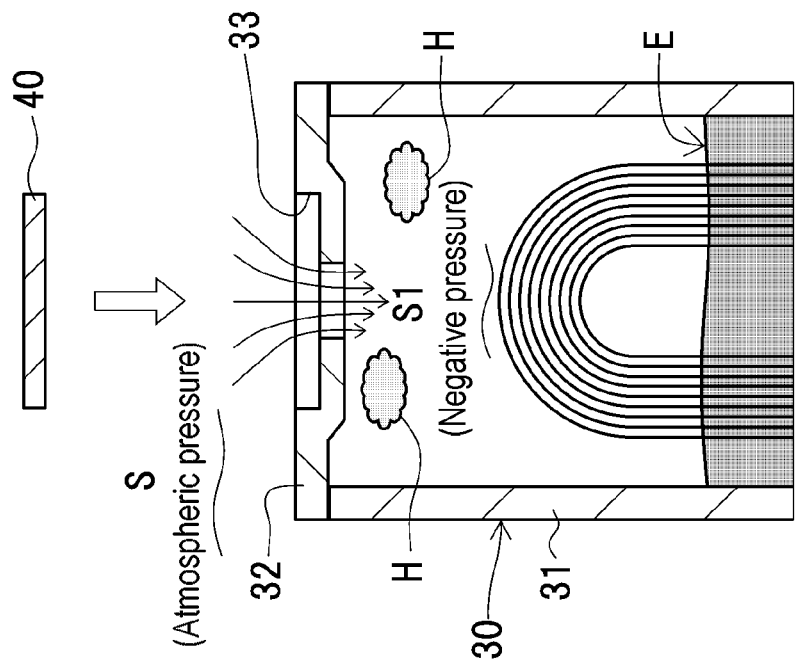
FIG. 7B shows how to perform laser-beam welding.

As shown in FIG. 7A, during or after the generation of this aerial current, the cap 40 is fit into the pouring hole 33 to seal the pouring hole 33 by applying a laser beam with the laser welding machine as shown in FIG. 7B (see the external space S, the internal space S1 and the arrows in FIG. 7).

This makes it possible to introduce the helium gas H trying to leak out through the pouring hole 33 by the difference in molecular weight into the internal space S1 of the exterior 30 by utilizing the aerial current when the introducing device 120 is detached from the pouring hole 33.

In other words, even after the temporary seal of the exterior 30 is removed, the helium gas H can be made to stay inside the exterior 30.

Therefore, it is possible to inhibit the helium gas H from leaking out through the pouring hole 33 before performing the leak testing step. In other words, in the first manufacturing step, it is possible to reduce the leakage amount of the helium gas before the leak testing step.

Thus, in the first manufacturing step, it is possible to perform the leak testing step with a small amount of the helium gas H. Therefore, it is possible to use the helium gas H efficiently, and consequently to improve an utilization rate of the helium gas. In other words, in the first manufacturing step, it is possible to reduce a cost required for the leak test.

Figure 8:
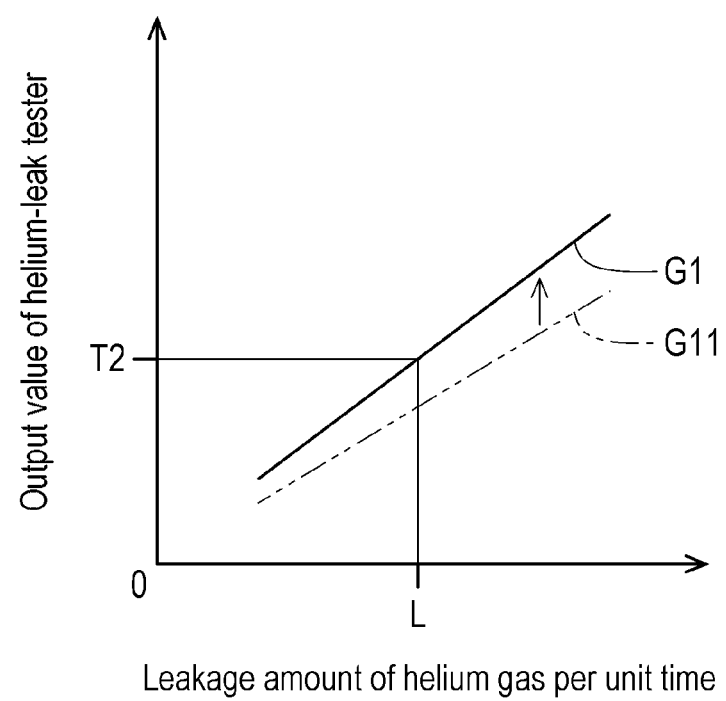
FIG. 8 shows a threshold in a leak testing step.

As shown in FIG. 8, in the leak testing step, it is determined that the exterior 30 has no leaks when the output value of the helium-leak tester is smaller than a threshold T2, and that the exterior 30 has the leaks when the output value of the helium-leak tester is the threshold T2 or more.

The output value of the helium-leak tester is wholly low because the amount of the helium gas H leaking from the exterior 30 per unit time decreases if the density of the helium gas inside the exterior 30 is low in the leak testing step as shown in a graph G11.

In the first manufacturing step, it is possible to maintain the density of the helium gas inside the exterior 30 from the introduction of the helium gas H to the leak testing step, and consequently to perform the leak testing step at the high density of the helium gas inside the exterior 30 as shown in a graph G1.

In other words, in the first manufacturing step, by reducing the leakage amount of the helium gas before the leak testing step, it is possible to wholly increase the output value of the helium-leak tester compared with a prior art (see the arrow in FIG. 8).

Specifically, in the first manufacturing step, it is possible to set the threshold T2 based on the output value of the helium-leak tester for the case of the high density of the helium gas inside the exterior 30.

This makes it possible to increase the threshold T2 of the leak testing step compared with a prior art, and consequently to perform the leak test with a high sensitivity.

Moreover, in the first manufacturing step, the leakage amount of the helium gas before the leak testing step is reduced, and thereby a small amount of the helium gas H determined to some extent leaks out before the leak testing step.

As a result, it is possible to reduce the variation in the density of the helium gas inside the exterior 30 in the leak testing step.

Figure 9:
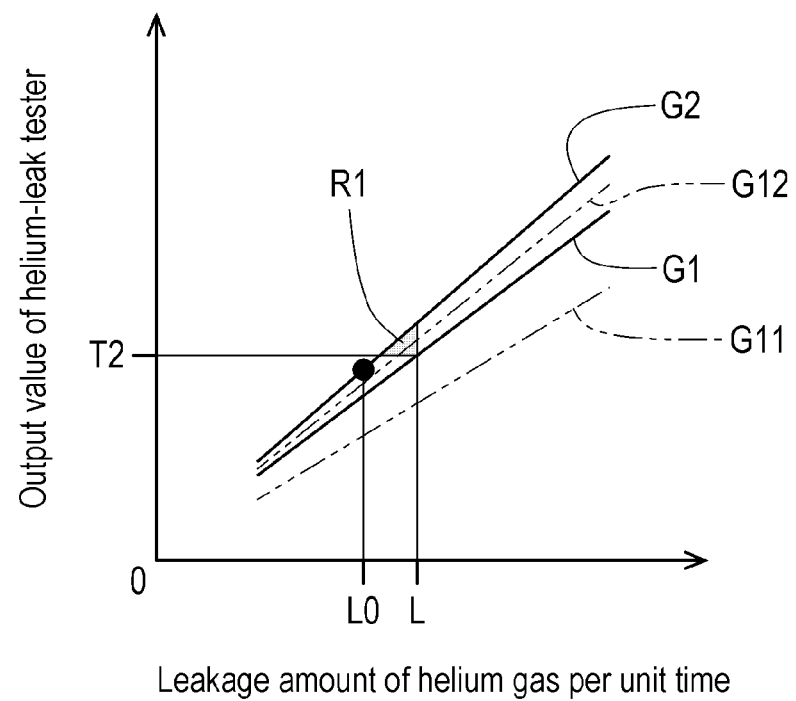
FIG. 9 shows a relationship between an output value of a helium-leak tester and a leakage amount of the helium gas per unit time.

This makes it possible, as shown in FIG. 9, to stabilize the output value (the graphs G1 and G2 indicated by a solid line in FIG. 9) of the helium-leak tester in the leak testing step, compared with the prior art (see the graphs G11 and G12 indicated by a two-dot chain line in FIG. 9).

Therefore, in the first manufacturing step, it is possible to inhibit the output value of the helium-leak tester from exceeding the threshold T2 even when testing the exterior 30 in which a leakage amount L0 of the helium gas H per unit time is slightly smaller than a predetermined amount L leading to a negative determination in the test (see the dot in FIG. 9).

Figure 16:
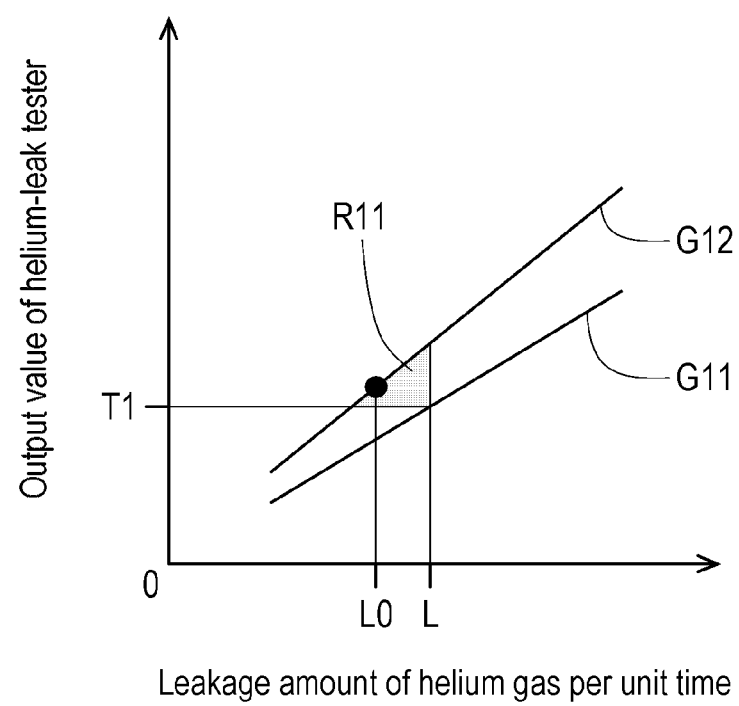
FIG. 16 shows a relationship between the output value of the helium-leak tester and the leakage amount of the helium gas per unit time in the prior art.

In other words, in the first manufacturing step, it is possible to improve an erroneous determination rate in the leak testing step (see areas R1 and R11 in FIGS. 9 and 16 where an erroneous determination is made).

As mentioned above, the first manufacturing step includes an adjusting step for making the pressure inside the exterior 30 into which the helium gas H has been introduced lower than the pressure outside the exterior 30.

Moreover, in the first manufacturing step, the pressure inside the exterior 30 temporarily sealed is reduced to the first pressure lower than the pressure outside the exterior 30, and then the pressure inside the exterior 30 is increased to the second pressure lower than the pressure outside the exterior 30 by introducing the detection gas into the decompressed exterior 30. Thereby, the introducing step and the adjusting step are performed at the same time.

This makes it possible to reduce the leakage amount of the helium gas before the leak testing step only by adjusting the introduction amount of the helium gas H. In other words, the adjusting step for improving the erroneous determination rate can be simplified.

A method for introducing the helium gas H is not limited to the above-mentioned method. For example, the exterior 30 is housed in a chamber, and the chamber is decompressed. Thereafter, the helium gas H may be introduced into the chamber to pressurize the chamber.

In this case, the pressure inside the chamber is adjusted so that the pressure inside the chamber is lower than the pressure outside the chamber after the introduction of the helium gas. Then, the exterior 30 is moved to the outside of the chamber to seal the pouring hole 33.

In other words, in the first manufacturing step, the exterior 30 is required to be temporarily sealed by covering the whole of the exterior 30 or by partly covering only the space connecting the external space S and the internal space S1 of the exterior 30, when the helium gas H is introduced.

The measurement result of the density of the helium gas for the case of introducing the helium gas H in the first manufacturing step is described below.

In measuring the density of the helium gas, test pieces according to first and second examples were fabricated by performing the first manufacturing step (see FIGS. 6 and 7).

The first and second examples differ in mainly the degree of the decompression of the exterior 30 immediately after the helium gas H is introduced.

Figure 10:
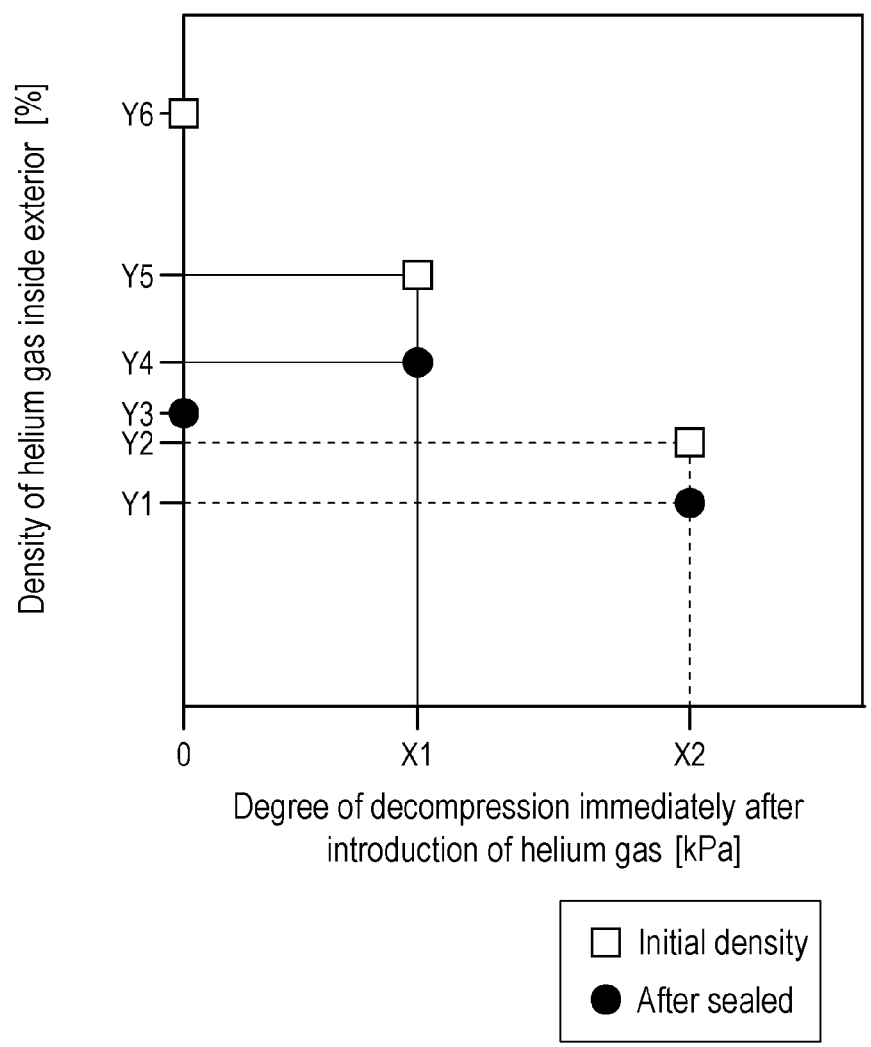
FIG. 10 shows a measurement result of a density of the helium gas inside the exterior in the leak testing step.

As shown in FIG. 10, the test piece according to the first example were fabricated by introducing the helium gas H into the exterior 30 decompressed to the first pressure so that the degree of the decompression of the exterior 30 immediately after the introduction of the helium gas became X1 [kPa].

In the test piece according to the first example, the density of the helium gas inside the exterior 30 immediately after the helium gas H is introduced (hereinafter referred to as an "initial density") was Y5 [%].

The test piece according to the second example were fabricated by introducing the helium gas H into the exterior 30 decompressed to the first pressure so that the degree of the decompression became X2 [kPa] larger than the degree of the decompression X1 in the first example.

In other words, in the test piece according to the second example, a smaller amount of the helium gas H is introduced into the exterior 30 than the first example, and therefore the initial density is Y2 [%] smaller than the initial density Y5 in the first example. Moreover, the test piece according to the second example has a larger difference in pressure between the inside and the outside of the exterior 30 into which the helium gas has been introduced than that of the test piece according to the first example.

In measuring the density of the helium gas, the test piece according to a comparative example were fabricated as an object to be compared with the test pieces according to the first and second examples by introducing the helium gas H into the exterior 30 decompressed to the first pressure so that the degree of the decompression of the exterior 30 immediately after the introduction of the helium gas became 0 [kPa].

In other words, the test piece according to the comparative example was fabricated by sealing the pouring hole 33 without the difference in pressure between the inside and the outside of the exterior 30 into which the helium gas has been introduced.

In the test piece according to the comparative example, a larger amount of the helium gas H is introduced into the exterior 30 than the first example, and therefore the initial density is Y6 [%] larger than the initial densities Y5 and Y2 of the test pieces in the first and second examples.

After introducing the helium gas H on the above-mentioned condition, the introducing device 120 was detached from the pouring hole 33. After a lapse of a predetermined time, the pouring hole 33 was sealed. Then, a hole was bored in the exterior 30, and a head of a helium density measuring device was speedily pressed against the hole to measure the density of the helium gas after the seal of the pouring hole 33.

In the test piece according to the comparative example, the density of the helium after the seal of the pouring hole 33 was Y3 [%] much smaller than the initial density Y6.

This was because a large amount of the helium gas H leaked out through the pouring hole 33 after the introduction of the helium gas.

On the other hand, the density of the helium was Y4 [%] slightly smaller than the initial density Y5. In other words, in the test piece according to the first example, the decrease in the density of the helium gas after the seal of the pouring hole 33 from the initial density Y5 to the density Y4 could be improved, compared with the test piece according to the comparative example.

Moreover, in the test piece according to the first example, although the initial density Y5 was smaller than the initial density Y6 in the comparative example, the density Y4 after the seal of the pouring hole 33 was larger than the density Y3 after the seal of the pouring hole 33 in the comparative example.

In other words, the in the test piece according to the first example, the utilization rate of the helium gas H was improved, compared with the comparative example.

In the test piece according to the second example, the decrease in the density of the helium gas after the seal of the pouring hole 33 from the initial density Y2 to the density Y1 could be improved, compared with the test piece according to the first example.

Figure 11:
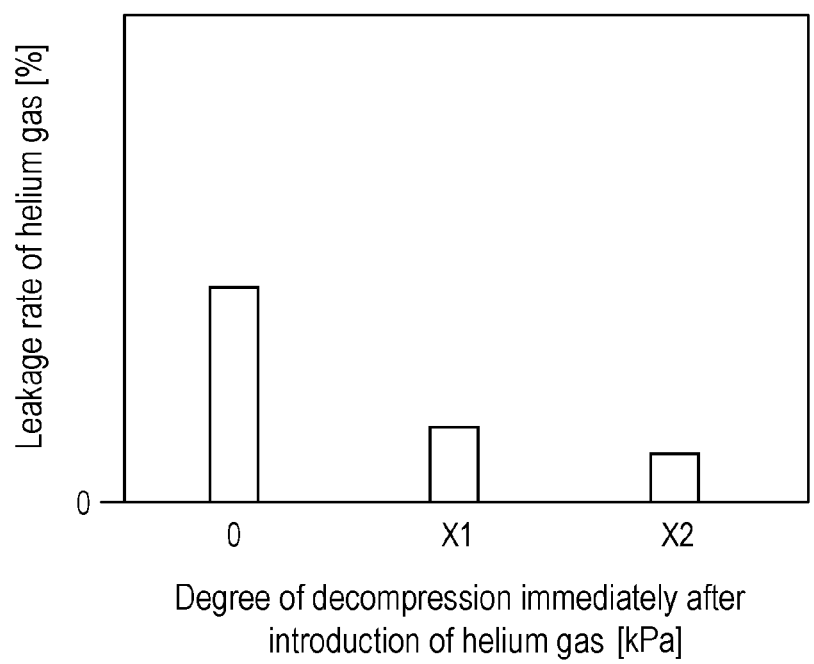
FIG. 11 shows a calculation result of a leakage rate of the helium gas before the leak testing step.

Each graph in FIG. 11 shows a leakage rate (ratio of the helium gas after the seal of the pouring hole 33 to the initial density) of the helium gas before the leak testing step of each test piece.

As shown in FIG. 11, the leakage rate of the helium gas before the leak testing step decreases with an increase in the degree of the decompression of the exterior 30 immediately after the introduction of the helium gas.

As mentioned above, the pressure inside the exterior 30 was made lower than the pressure outside the exterior 30, thus enabling to minimize the leakage amount of the helium gas before the leak testing step, which showed that the variation in the density of the helium gas during the leak testing step could be reduced.

In other words, in the first manufacturing step, it was found that the erroneous determination rate in the leak testing step could be improved.

Described below is a second manufacturing step for manufacturing the battery 10 as a second embodiment of a method for manufacturing a sealed battery according to the present invention.

The second manufacturing step differs from the first manufacturing step in method for making the pressure inside the exterior 30 lower than the pressure outside the exterior 30.

For this reason, the method for making the pressure inside the exterior 30 lower than the pressure outside the exterior 30 is specifically described below.

Figure 12:
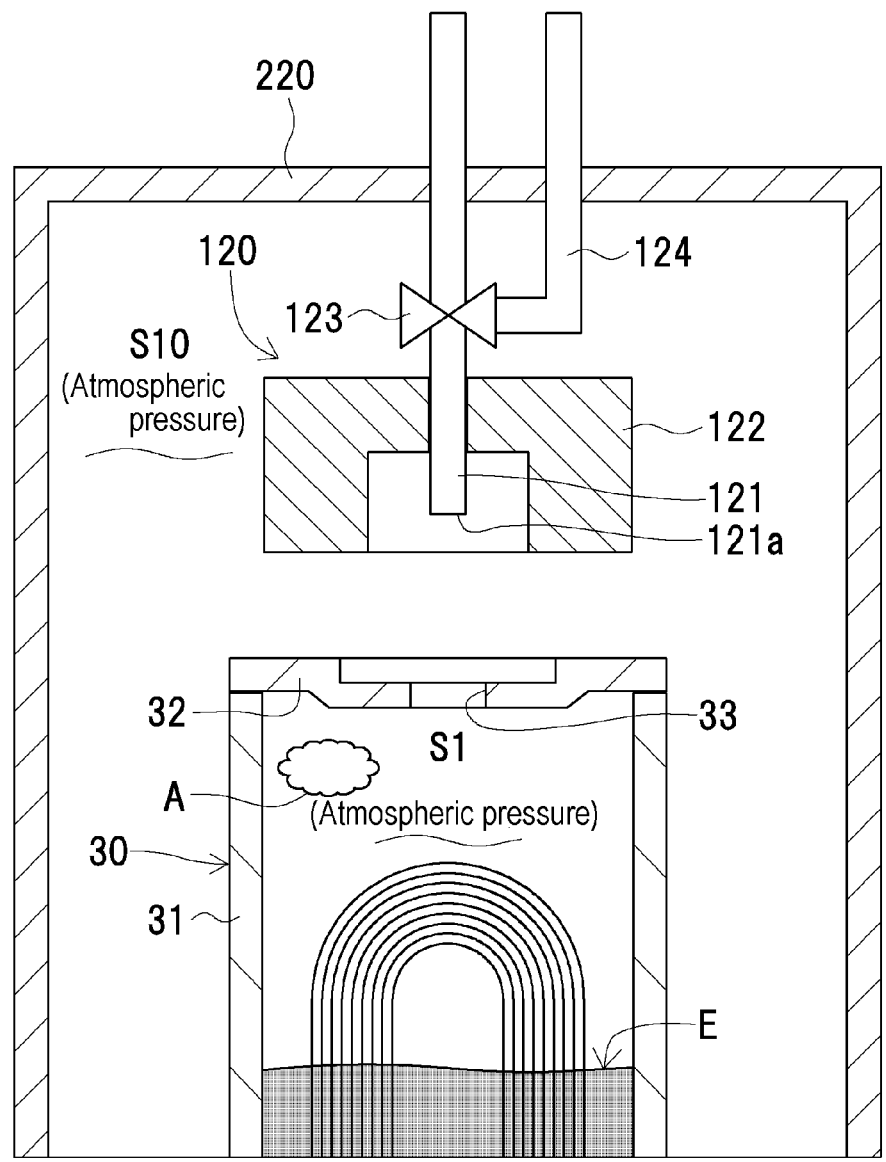
FIG. 12 shows a chamber for pressurizing an external space of the exterior.

As shown in FIG. 12, in the second manufacturing step, after the electrolyte solution E is poured into the exterior 30, the exterior 30 is housed in a chamber 220. Inside the chamber 220, the introducing device 120 in the first manufacturing step is arranged.

In a stage before the helium gas H is introduced into the exterior 30, each of the pressures inside the chamber 220 and inside the exterior 30 is the atmospheric pressure.

Figure 13:
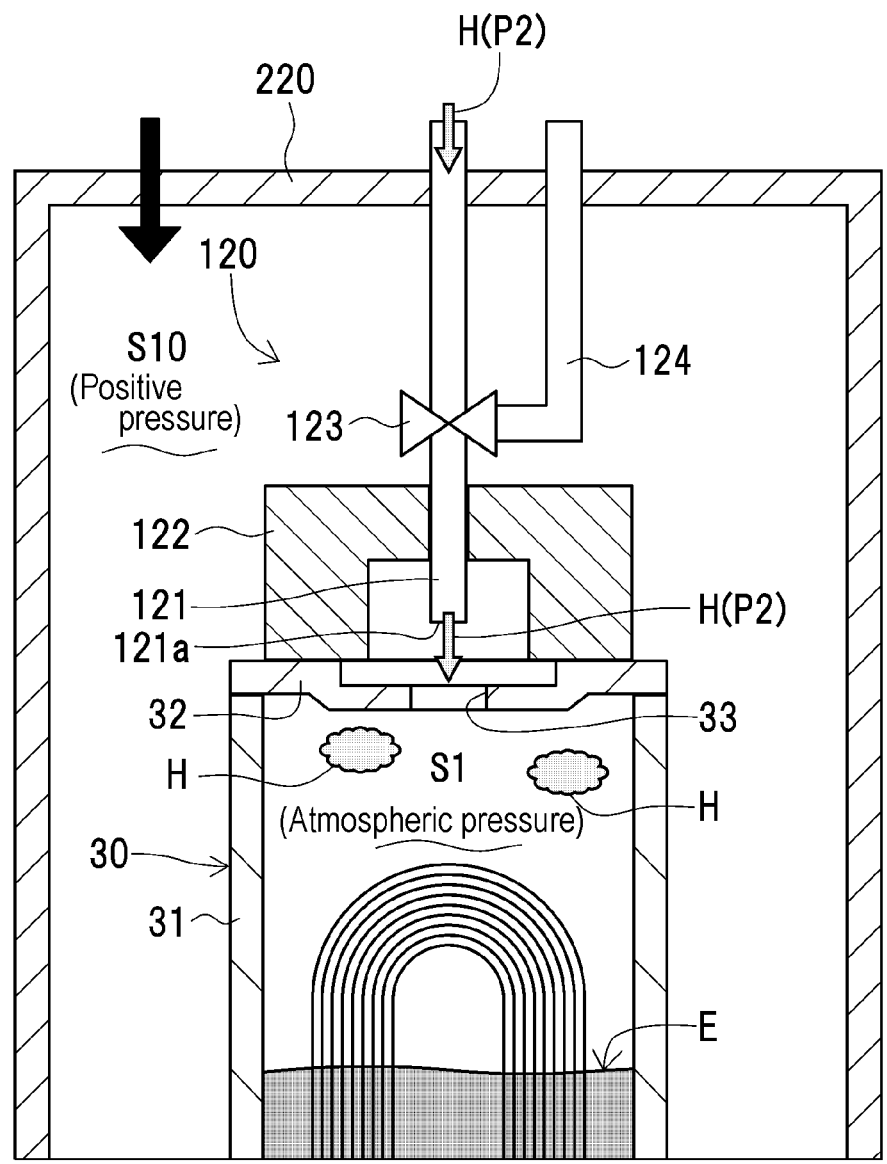
FIG. 13 shows how to pressurize the external space of the exterior in a second manufacturing step for manufacturing the sealed battery.

As shown in FIG. 13, in the second manufacturing step, the helium gas H is introduced into the exterior 30 arranged in the chamber 220. In other words, in the second manufacturing step, an internal space S10 of the chamber 220 is the external space of the exterior 30.

In the second manufacturing step, after the pressure inside the exterior 30 is reduced to a predetermined pressure, the helium gas H is introduced into the exterior 30 in the amount according to the predetermined pressure to return the pressure inside the exterior 30 to the atmospheric pressure (see the internal space S1 in FIG. 13).

At this time, a compressed air is introduced into the chamber 220 to increase the pressure inside the chamber 220 (see the black-painted arrow in FIG. 13).

In this manner, a positive pressure is produced in the chamber 220 (see the internal space S10 in FIG. 13).

Figure 14:
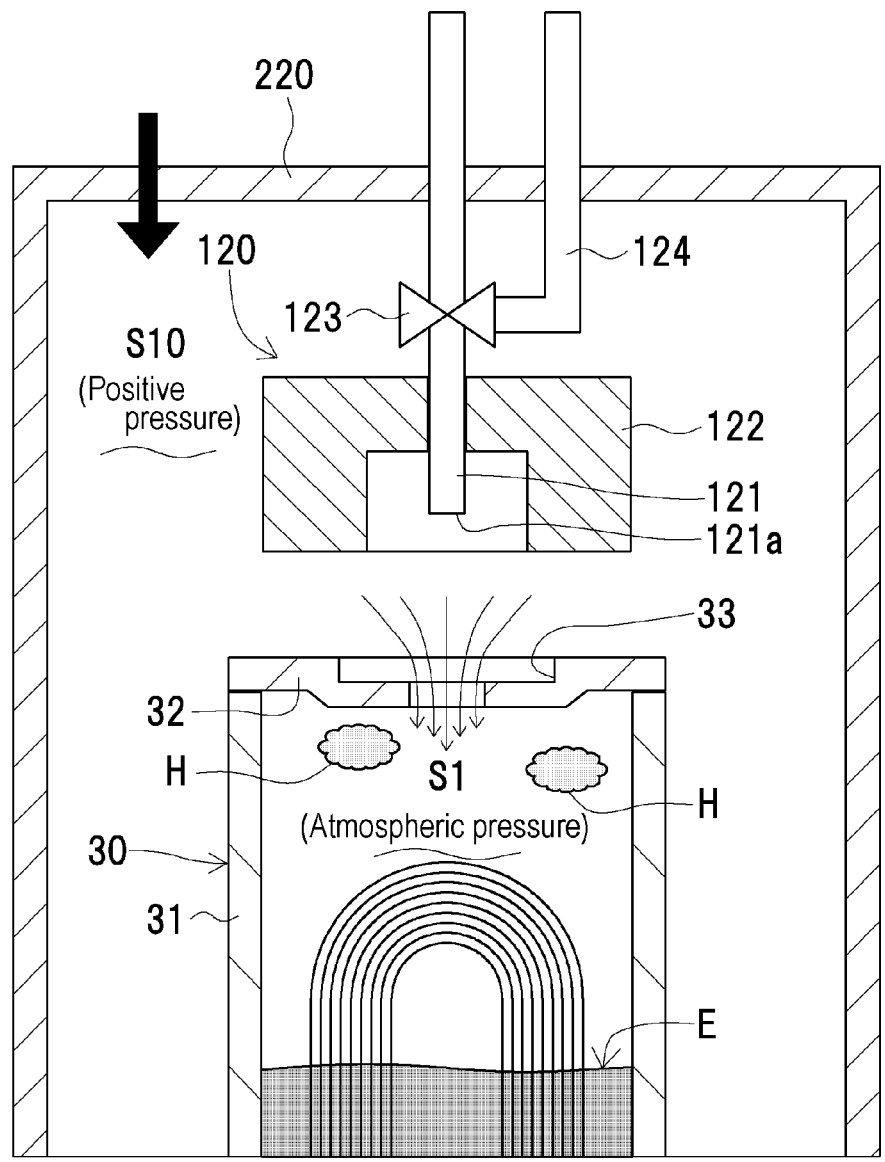
FIG. 14 shows how to detach the introducing device from the pouring hole in the second manufacturing step for manufacturing the sealed battery.
Figure 15:
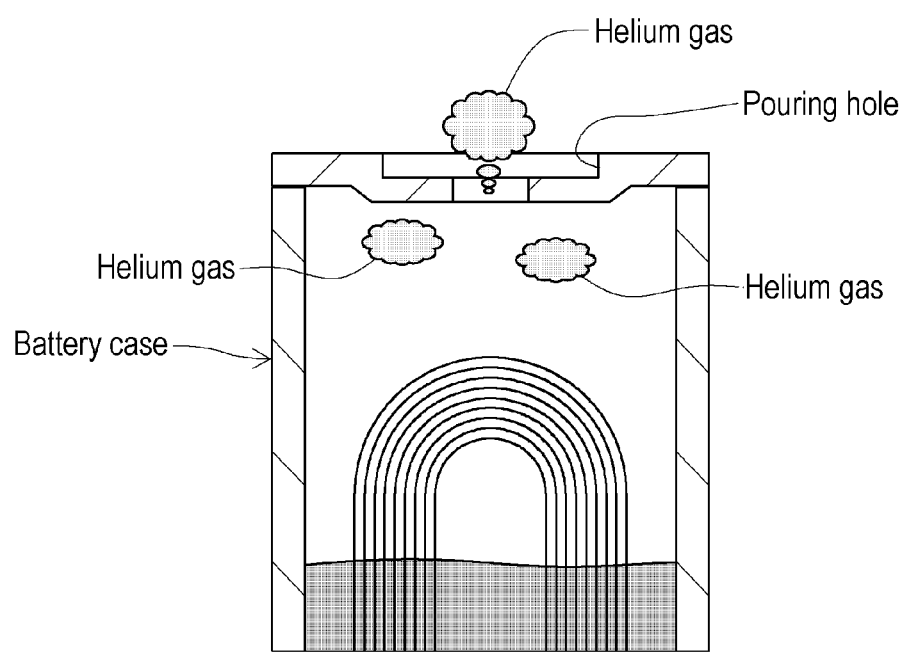
FIG. 15 shows a situation where the helium gas is leaking out in a prior art.

As shown in FIG. 14, after the pressure inside the chamber 220 is increased, the introducing device 120 is detached from the pouring hole 33.

At this time, an aerial current can be generated from the pouring hole 33 toward the inside of the exterior 30 by the difference in pressure between the internal spaces S1 and S10 of the exterior 30 and the chamber 220 (see the arrows in FIG. 14). In the second manufacturing step, it is possible to reduce the leakage amount of the helium gas before the leak testing step.

After the introducing device 120 is detached from the pouring hole 33, the pressure inside the chamber 220 is continuously increased and the pouring hole 33 is sealed inside the chamber 220 (see FIG. 7).

In other words, in the second manufacturing step, the pressure inside the exterior 30 becomes lower than the pressure outside the exterior 30 not by reducing the pressure inside the exterior 30 but by increasing the pressure outside the exterior 30, namely, the pressure inside the chamber 220.

This makes it possible, in the second manufacturing step, to maintain the density of the helium gas inside the exterior 30 from the introduction of the helium gas H to the leak testing step, and consequently to perform the leak testing step at the high density of the helium gas inside the exterior 30.

Therefore, in the second manufacturing step, it is possible to improve the erroneous determination rate in the leak testing step (see FIG. 9).

A method for making the pressure inside the exterior 30 lower than the pressure outside the exterior 30 is not limited to the methods in the first and second manufacturing steps.

For example, the pressure inside the exterior 30 may be reduced and the pressure outside the exterior 30 may be increased.

In this case, for example, after the exterior 30 is housed in the chamber 220 shown in FIG. 12, the pressure inside the exterior 30 is reduced in a manner similar to the first manufacturing step and the pressure inside the chamber 220 is increased in a manner similar to the second manufacturing step.

This makes it possible to further increase the difference in pressure between the inside and the outside of the exterior 30, and consequently to effectively reduce the leakage amount of the helium gas before the leak testing step.

Moreover, the pressure inside the exterior 30 may be increased to a third pressure several kilopascal higher than the atmospheric pressure, and the pressure outside the exterior 30 may be increased to a fourth pressure several tens of kilopascal higher than the third pressure.

In this case, for example, after the exterior 30 is housed in the chamber 220 shown in FIG. 12, the introduction amount of the helium gas H is increased to increase the pressure inside the exterior 30 into which the helium gas has been introduced, and the pressure inside the chamber 220 is increased in a manner similar to the second manufacturing step.

Moreover, the pressure outside the exterior 30 may be reduced to a fifth pressure several kilopascal lower than the atmospheric pressure, and the pressure inside the exterior 30 may be reduced to a sixth pressure several tens of kilopascal lower than the fifth pressure.

In this case, for example, after the exterior 30 is housed in the chamber 220 shown in FIG. 12, the pressure inside the exterior 30 is reduced in a manner similar to the first manufacturing step, and an air inside the chamber 220 is discharged to reduce the pressure inside the chamber 220.

In other words, at least one of the pressure inside the exterior 30 and the pressure outside the exterior 30 is adjusted.

Preferably, the pressure inside the exterior 30 is lower (e.g., several tens of kilopascal lower) than the pressure outside the exterior 30 so that the leakage amount of the helium gas before the leak testing step may be reduced to some extent.

The detection gas is not limited to the helium gas in the first and second manufacturing steps, but the helium gas is preferably used. This is because the use of the helium gas produces various effects compared with other gases as follows: an influence of the detection gas on battery performance can be prevented, and leak from a minute hole can be detected because helium has a small molecular diameter.

Moreover, instead of introducing the helium gas, a mixture gas of the helium gas and a gas other than the helium gas may be introduced.

INDUSTRIAL APPLICABILITY

The present invention is applicable to a method for manufacturing a sealed battery, including a leak testing step for detecting leak of a detection gas introduced into a battery case.

REFERENCE SIGNS LIST

10: battery (sealed battery)
30: exterior (battery case)
H: helium gas (detection gas)

What is claimed is:

1. A method for manufacturing a sealed battery, including a leak testing step for detecting leak of a detection gas introduced into a battery case, the method comprising:
   sealing the battery case temporarily by covering the battery case;
   reducing a pressure inside the battery case temporarily sealed to a first pressure lower than a pressure outside the battery case;
   introducing the detection gas into the decompressed battery case to increase the pressure inside the battery case to a second pressure lower than the pressure outside the battery case;
   sealing the battery case while generating atmospheric aerial current toward the inside of the battery case, after detaching the temporary sealing; and thereafter
   performing the leak testing step.

* * * * *